(12) United States Patent
Ting

(10) Patent No.: US 9,258,036 B1
(45) Date of Patent: Feb. 9, 2016

(54) NARROW AND SECURE NEAR FIELD COMMUNICATION RING DEVICE

(71) Applicant: Shao-Chieh Ting, New Taipei (TW)

(72) Inventor: Shao-Chieh Ting, New Taipei (TW)

( * ) Notice: Subject to any disclaimer, the term of this patent is extended or adjusted under 35 U.S.C. 154(b) by 1 day.

(21) Appl. No.: 14/336,657

(22) Filed: Jul. 21, 2014

(51) Int. Cl.
*H04B 5/00* (2006.01)

(52) U.S. Cl.
CPC ............ *H04B 5/0081* (2013.01); *H04B 5/0031* (2013.01)

(58) Field of Classification Search
CPC ..... H04B 5/00; H04B 5/0062; G06K 7/10386
USPC ............ 455/41.1, 41.2, 90.3, 575.1; 340/10.1
See application file for complete search history.

(56) References Cited

U.S. PATENT DOCUMENTS

| | | | | |
|---|---|---|---|---|
| 8,740,067 B1* | 6/2014 | Chinoy | ............ | G06Q 20/35785 235/375 |
| 2014/0230019 A1* | 8/2014 | Civelli | .................... | G06F 21/30 726/4 |
| 2014/0279528 A1* | 9/2014 | Slaby | .................. | H04L 63/0853 455/411 |

* cited by examiner

*Primary Examiner* — Quochien B Vuong
(74) *Attorney, Agent, or Firm* — Muncy, Geissler, Olds & Lowe, P.C.

(57) ABSTRACT

The present invention winds an antenna wire of a NFC (Near Field Communication) chip and antenna component round inside a hard concave ring, which is then encapsulated in a room temperature-solidifiable resin adhesive. If metal material is used, then a repeater material is disposed between the metal and the NFC chip and antenna component to prevent interference thereto. The present invention thus resolves the frequently seen shortcomings of NFC circuit component failure because of the high temperature when encapsulating, poor waterproofing, and the main body of the ring being too wide. In particular, wearing the NFC ring device on a finger reduces the sensing distance of the NFC device to a minimum, and prevents data from being stolen. If there are abnormalities in receiving and transmitting information, then taking off the ring and placing the circumferential plane of the ring close to the NFC sensor improves the situation.

3 Claims, 6 Drawing Sheets

NARROW AND SECURE NEAR FIELD COMMUNICATION RING DEVICE

BACKGROUND OF THE INVENTION (a) Field of the Invention

The present invention relates to a NFC (Near Field Communication) ring device, in which an antenna wire of a NFC chip and antenna component is wound round the inside of a concave ring made from a hard material, and is then encapsulated in a room temperature-solidifiable resin adhesive ready to be worn on a finger. Accordingly, the present invention is not only convenient for the user, but also, because of the reduction in the sensing distance of the device to a minimum, the NFC ring device is able to prevent data from being stolen. Moreover, if there are abnormalities in receiving and transmitting information, then the ring can be taken off and the circumferential plane of the ring placed close to the NFC sensor to improve the situation.

(b) Description of the Prior Art

NFC (Near Field Communication) is a new trend in communications technology, and is in many ways better than Bluetooth in areas such as: faster data transfer speed, higher security, and lower costs and energy consumption.

In addition, NFC rings sold in the current market. are normally made from metal, and then modified using plastic rubber, with an NFC circuit and an antenna coil or NFC flexible PCB (Printed Circuit Board) disposed between the plastic rubber and the ring surface, thereby enabling the NFC antenna to penetrate the plastic rubber. A wireless signal can thus be transmitted via a NFC communication mode. However, such NFC rings are inconvenient to use (see FIG. 6) because of their poor waterproofing, and the width of the ring being too large.

Hence, in light of the aforementioned shortcomings, and pursuing the spirit of excellence in research and development, the inventors of the present invention have found a way to improve the aforementioned shortcomings, and thus propose the present invention.

SUMMARY OF THE INVENTION

The primary objective of the present invention lies in providing a narrow and secure NFC (Near Field Communication) ring device, and more particularly a design which provides the narrowest NFC ring currently available. The NFC ring device primarily comprises a ring main body, a NFC chip and antenna component, and a room temperature-solidifiable resin adhesive. With such components the present invention provides the narrowest NFC ring device, and achieves the requirements for practicability, ease of wearing, and an aesthetic design.

Another objective of the present invention lies in adopting a spiral winding method to dispose the NFC chip and antenna component inside a groove on the outer edge of the ring main body, as well as enabling the diameter and length of an antenna wire of the NFC chip and antenna component to be adjusted according to different external diameters of the ring main body for good near field communication, and narrowing the ring main body to make it suitable for wearing on a finger. Moreover, if there are abnormalities in receiving and transmitting information, then the ring can be taken off and the circumferential plane of the ring directly placed close to the NFC sensor to improve the situation.

Another objective of the present invention lies in filling the NFC chip and antenna component with an outer layer of room temperature-solidifiable resin adhesive (such as epoxy resin), thus encapsulating the NFC chip and antenna component. The application function of the NFC ring device is thus satisfied, and also achieves the requirements for waterproofing and an aesthetic design.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
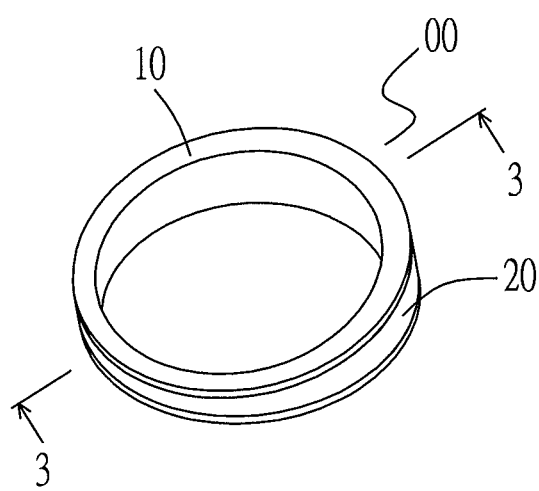
FIG. 1 is a perspective view of the present invention.
Figure 2:
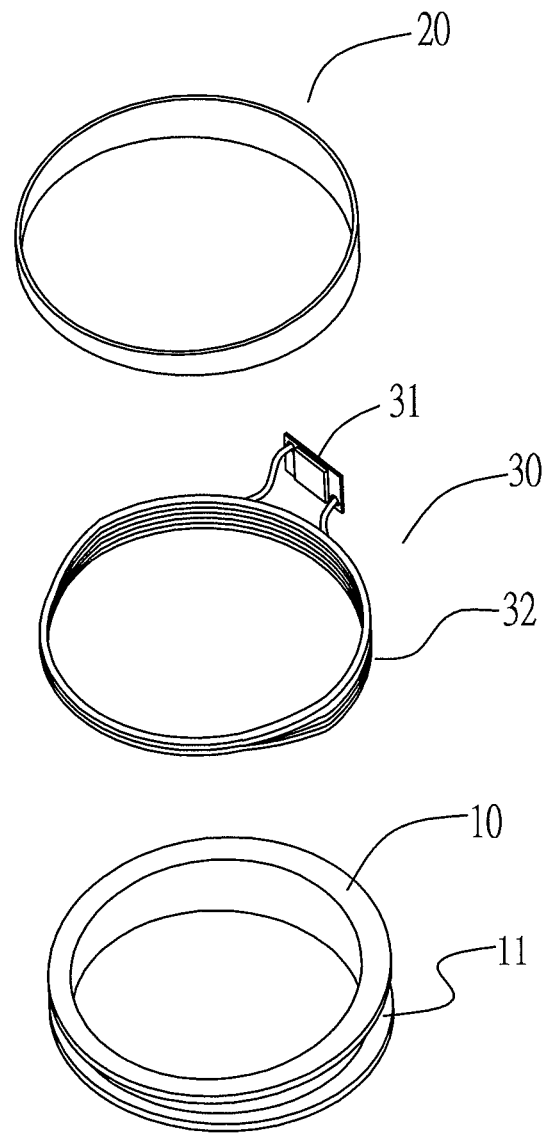
FIG. 2 is an exploded view of the present invention.

Regarding the detailed content and structural means of the present invention, please refer to the description of the diagrams as follows:

Referring to FIG. 1 and FIG. 2, which show a narrow and secure NFC (Near Field Communication) ring device 00 of the present invention design, primarily comprising a ring main body 10, a room temperature-solidifiable resin adhesive 20, and a NFC chip and antenna component 30. The NFC chip and antenna component 30 is the core component of the ring main body 10, and achieves the function of good near field communication.

The ring main body 10, which enables the NFC ring device to be worn on the finger, is produced using hard material such as a metal, plastic, pottery stone, or zircon. The outer edge of the ring main body 10 is provided with an annular groove 11, and the annular groove 11 is used to enable the NFC chip and antenna component 30 to be wound round and disposed therein, and then be encapsulated with the room temperature-solidifiable resin adhesive 20. Accordingly, the NFC chip and antenna component 30 is fixed within the annular groove 11, and thus achieves the objectives of hard fixing and ring waterproofing, as well as adding to the aesthetic design.

The NFC chip and antenna component 30 is assembled from a chip 31 and an antenna 32. Narrowing and reducing the width of the ring is achieved by spiral winding the antenna 32 inside the groove 11. Moreover, the diameter and length of the wire of the antenna 32 can be adjusted according to different external diameters of the ring main body 10 to achieve the objective of good field communication.

Figure 3:
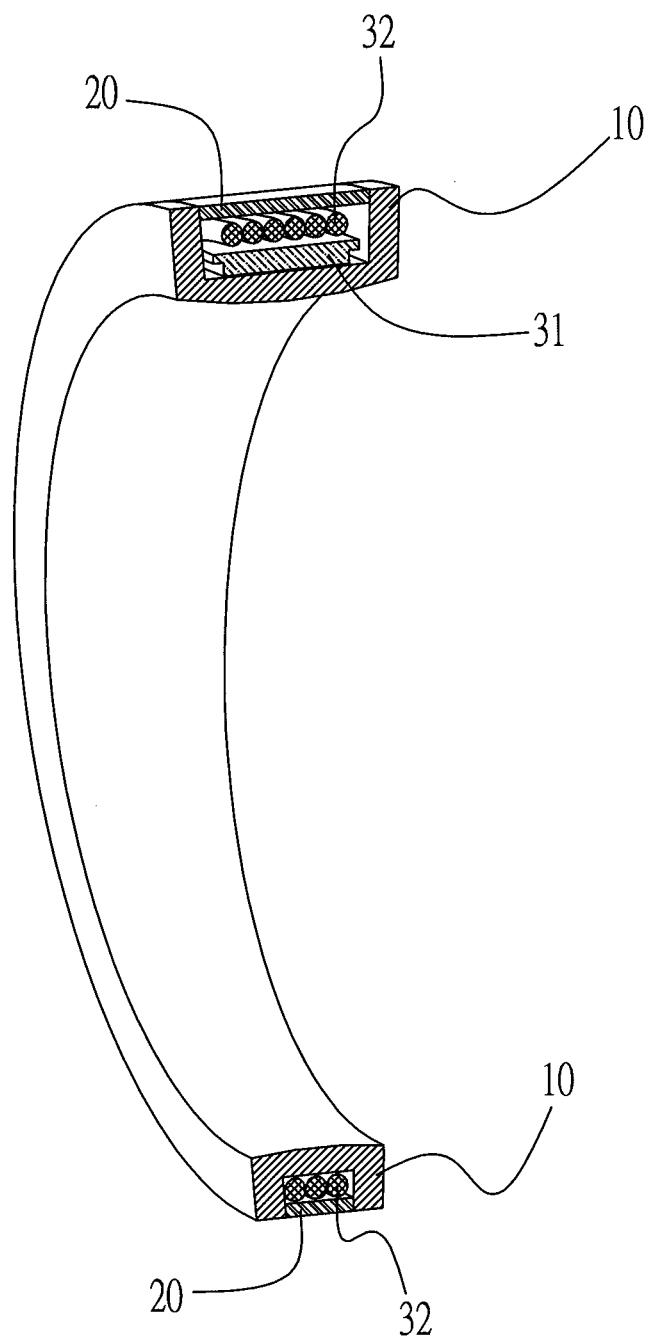
FIG. 3. is an enlarged cross-sectional schematic view of the present invention.

Referring to FIG. 3, which shows an enlarged cross-sectional schematic view of the present invention, and clearly shows the assembly relationship of each component of the present invention.

Figure 4:
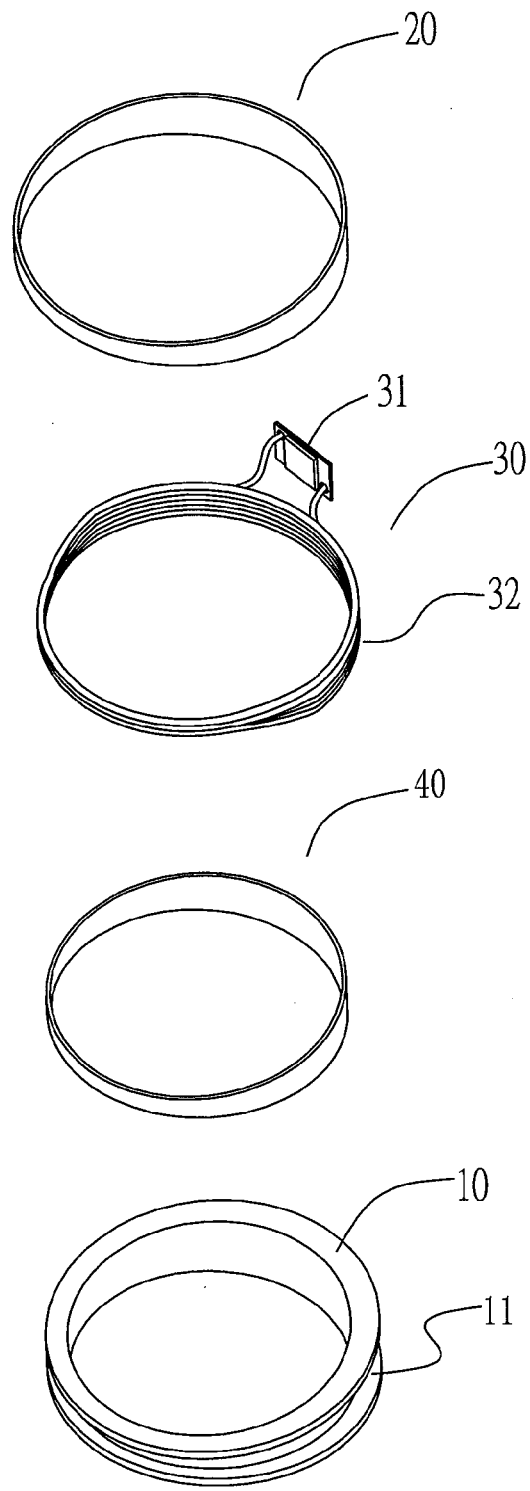
FIG. 4. is a schematic view of the present invention with the addition of a repeater material.
Figure 5:
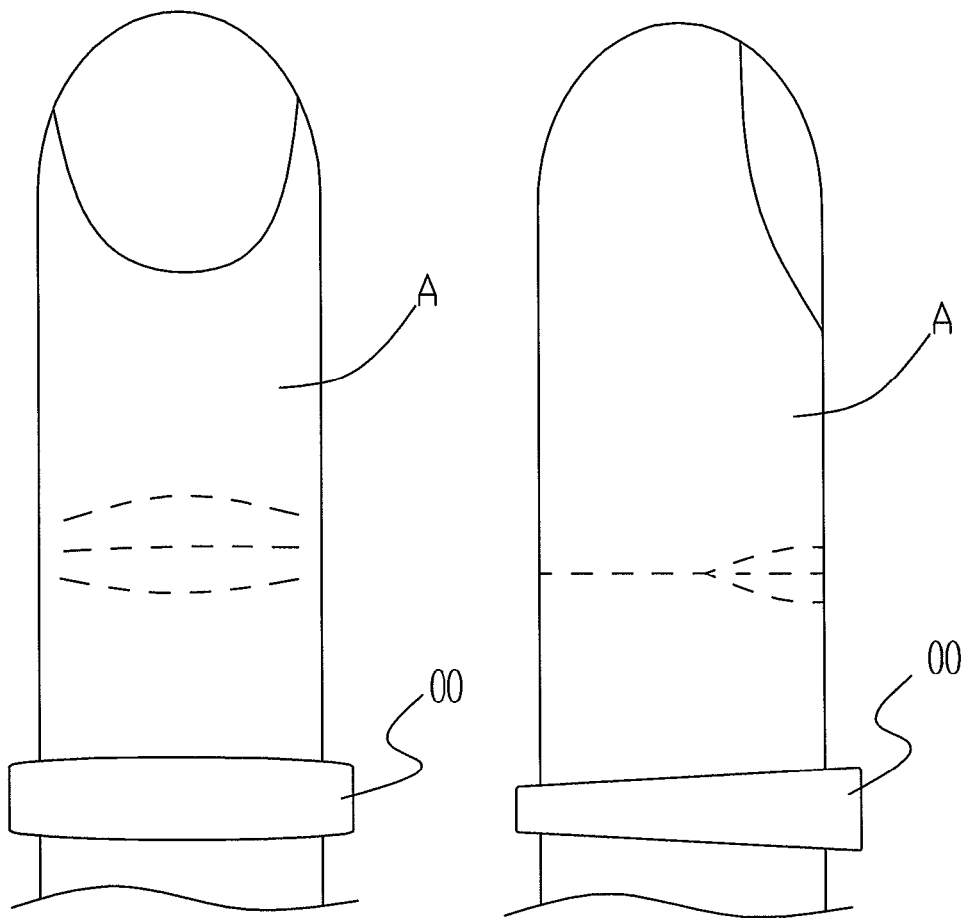
FIG. 5 is a front view and a side view of the present invention worn on a finger.
Figure 6:
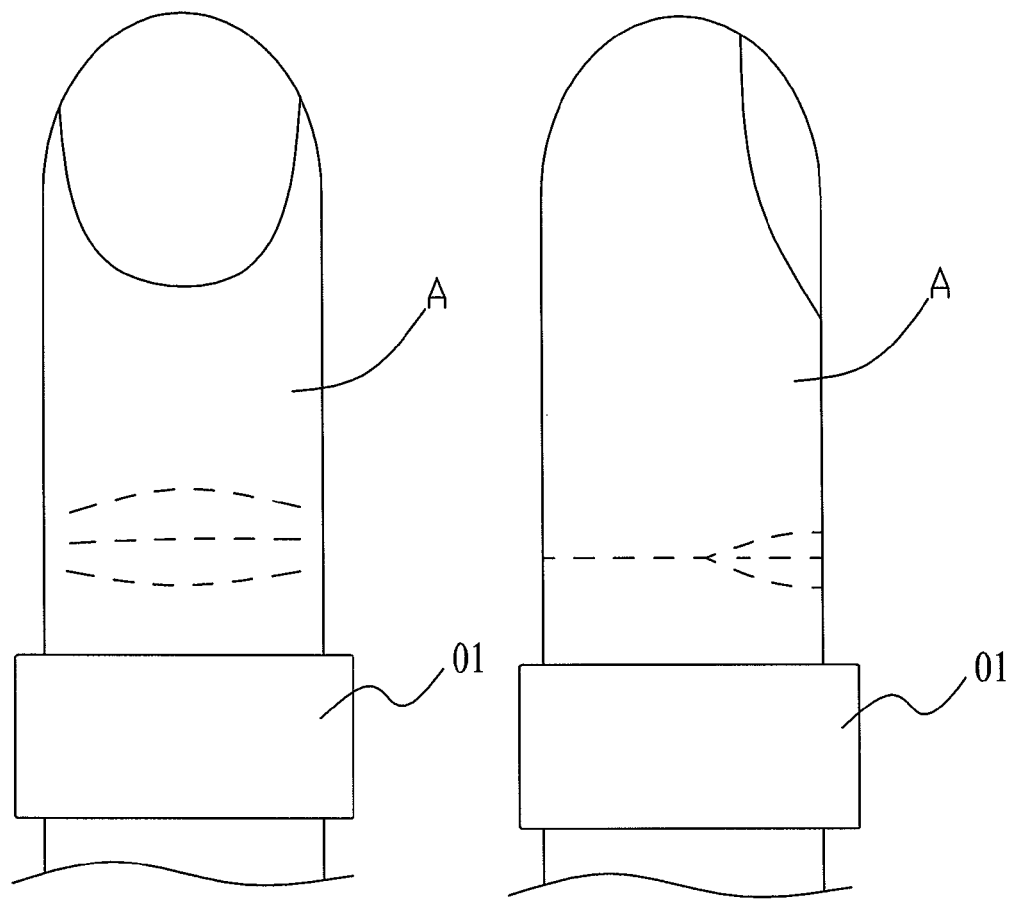
FIG. 6 is a front view and side view of a NFC (Near Field Communication) ring currently available in the market worn on a finger.

Referring to FIG. 4, which discloses the ring main body 10 of the present invention. If the ring main body 10 is produced using metal material, then a repeater material 40 needs to be additionally disposed between the ring main body 10 and the NFC chip and antenna component 30 to provide a function that prevents the metal from interfering with the antenna 32 receiving and transmitting information Referring to FIG. 5. which discloses a front view and side view of the present invention worn on a finger. Accordingly, the present invention becomes a NFC ring when worn on the finger, and thus achieves convenience of use.

In conclusion, the design of the narrow and secure NFC ring device of the present invention is an innovative design that substantially narrows the width of a NFC ring. The present invention is thus certainly provided with innovativeness and advancement, and the use of technology is undoubtedly new and original. The effectiveness of the present invention successfully fulfills the design objectives, and clearly provides reasonable advancement. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A narrow and secure Near Field Communication (NFC) ring device comprising:
    a ring main body, the ring main body is produced using hard material, and an outer edge of the ring main body is provided with an annular groove that enables a NFC chip and antenna component to be wound round therein and fixed in a resin adhesive;
    a room temperature-solidifiable resin adhesive, the annular groove is filled with the resin adhesive to fix the NFC chip and antenna component therein to achieve an objective of rigid fixing and waterproofing;
    the NFC chip and antenna component, the NFC chip and antenna component is the core component of the ring main body which enables achieving the function of near field communication.

2. The narrow and secure Near Field Communication ring device according to claim 1, wherein a spiral winding method is adopted to wind an antenna wire of the NFC chip and antenna component round inside the annular groove of ring main body; a diameter and length of the antenna wire can be adjusted to improve the function of the antenna to provide good near field communication.

3. The narrow and secure Near Field Communication ring device according to claim 1, wherein an exterior of the NFC chip and antenna component is encapsulated using the room temperature-solidifiable resin adhesive to achieve waterproofing of the ring main body and improving aesthetics of the NFC ring device.

* * * * *